US012754814B2

(12) United States Patent
Alshawabkeh et al.

(10) Patent No.: US 12,754,814 B2
(45) Date of Patent: Oct. 6, 2026

(54) THERMAL MANAGEMENT OF STORAGE DEVICES

(71) Applicant: Dell Products L.P., Round Rock, TX (US)

(72) Inventors: Malak Alshawabkeh, Franklin, MA (US); Kuolin Hua, Natick, MA (US); Ramesh Doddaiah, Westborough, MA (US)

(73) Assignee: Dell Products L.P., Roundrock, TX (US)

(*) Notice: Subject to any disclaimer, the term of this patent is extended or adjusted under 35 U.S.C. 154(b) by 1 day.

(21) Appl. No.: 18/915,611

(22) Filed: Oct. 15, 2024

(65) Prior Publication Data

US 2026/0104977 A1 Apr. 16, 2026

(51) Int. Cl.
*G06F 11/30* (2006.01)
*G06F 1/20* (2006.01)
*G06F 3/06* (2006.01)

(52) U.S. Cl.
CPC .......... *G06F 11/3058* (2013.01); *G06F 1/206* (2013.01); *G06F 3/061* (2013.01);
(Continued)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 5,115,225 A * 5/1992 Dao ...................... G11B 33/144 360/97.12
6,405,277 B1 * 6/2002 Jen ........................ G11B 33/144 360/75
(Continued)

OTHER PUBLICATIONS

P. Kakosimos, "Reliable Thermal Monitoring of Electric Machines through Machine Learning," 2023 IEEE International Conference on Prognostics and Health Management (ICPHM), Montreal, QC, Canada, Jun. 5-Jul. 2023, pp. 12-19, doi: 10.1109/ICPHM57936.2023.10194194. (Year: 2023).*

*Primary Examiner* — Daniel C. Chappell
(74) *Attorney, Agent, or Firm* — Krishnendu Gupta; Nikhil Patel

(57) ABSTRACT

One or more aspects of the present disclosure relate to enhancing storage device performance and longevity. In embodiments, Self-Monitoring, Analysis, and Reporting Technology (SMART) data collected from storage devices can be analyzed using one or more machine learning models. Additionally, the embodiments can employ Principal Component Analysis (PCA) to reduce data dimensionality and K-means clustering to group storage devices with similar characteristics. The embodiments can also predict potential thermal throttling events and proactively adjust read/write rates to prevent performance degradation. Optionally, the embodiments can transfer highly active data from hot to cooler devices. For example, the embodiments can control logical-to-physical track mapping based on SMART data and direct data to physical tracks accordingly. By correlating SMART data with input/output (IO) workload analysis, the embodiments can predict when device temperatures will reach thermal thresholds and take preventive actions.

14 Claims, 5 Drawing Sheets

(52) U.S. Cl.
CPC .......... *G06F 3/0616* (2013.01); *G06F 3/0653* (2013.01); *G06F 3/0671* (2013.01)

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS

| | | | | |
|---|---|---|---|---|
| 2010/0268481 | A1* | 10/2010 | Lee | G11B 5/5582 702/56 |
| 2014/0304444 | A1* | 10/2014 | Walker | G06F 13/24 711/170 |
| 2020/0110536 | A1* | 4/2020 | Navon | G06F 3/0616 |
| 2023/0400899 | A1* | 12/2023 | Gunda | G06F 3/0616 |

* cited by examiner

THERMAL MANAGEMENT OF STORAGE DEVICES

BACKGROUND

Storage drives are fundamental components in modern computing systems, serving as the primary means of data storage and retrieval. These drives come in various forms, each offering unique performance, capacity, and reliability advantages. Traditional hard disk drives (HDDs) utilize spinning platters and magnetic heads to read and writex data, providing high storage capacities at relatively low costs. On the other hand, solid-state drives (SSDs) employ NAND flash memory for data storage, offering faster read and write speeds and improved durability due to the absence of moving parts. Both drives play crucial roles in various applications, from personal computers and mobile devices to large-scale data centers and enterprise storage systems. As technology advances, storage drives evolve to meet the growing demands for faster access times, larger capacities, and improved energy efficiency in diverse computing environments.

SUMMARY

One or more aspects of the present disclosure relate to the thermal management of storage devices. In embodiments, Self-Monitoring, Analysis, and Reporting (SMART) data is collected from one or more storage devices via one or more sensors of the one or more storage devices. Additionally, mapping of logical tracks to physical tracks of the one or more storage devices is controlled based on the SMART data. Further, data to the physical tracks is directed based on the mapping of the logical tracks to the physical tracks of the one or more storage devices.

In embodiments, an input/output (IO) workload can be received by a storage array housing the one or more storage devices. In addition, IO operations corresponding to the IO workload can be analyzed. Further, the SMART data can be correlated with IO data corresponding to the analysis of the IO operations.

In embodiments, thermal throttling of the one or more storage devices can be predicted based on the SMART data.

In embodiments, when a temperature corresponding to one or more portions of the one or more storage devices will reach a thermal threshold can be predicted based on the SMART data.

In embodiments, a rate of read or write input/output (IO) operations to the one or more portions of at least one subject storage device of the one or more storage devices can be adjusted based on the prediction of when the temperature corresponding to the one or more portions of the one or more storage devices will reach the thermal threshold.

In embodiments, the rate of the read or write IO operations to the one or more portions of the at least one subject storage device can be adjusted by remapping logical tracks associated with physical tracks of the one or more portions of the subject storage device to other physical tracks of the subject storage device with temperature predictions under the thermal threshold.

In embodiments, logical tracks associated with physical tracks of the one or more portions of the subject storage device can be remapped to physical tracks corresponding to one or more portions of another storage device of the one or more storage devices. For instance, the one or more portions of the other storage device can have temperature predictions under the thermal threshold.

In embodiments, a dimensionality of the SMART data can be reduced using one or more principal component analysis (PCA) techniques.

In embodiments, the one or more storage devices with similar characteristics can be grouped.

In embodiments, k-means clustering can be performed on the reduced dimensionality of the SMART data to identify groups of the one or more storage devices with the similar characteristics.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments'principles.

DETAILED DESCRIPTION

Figure 1:
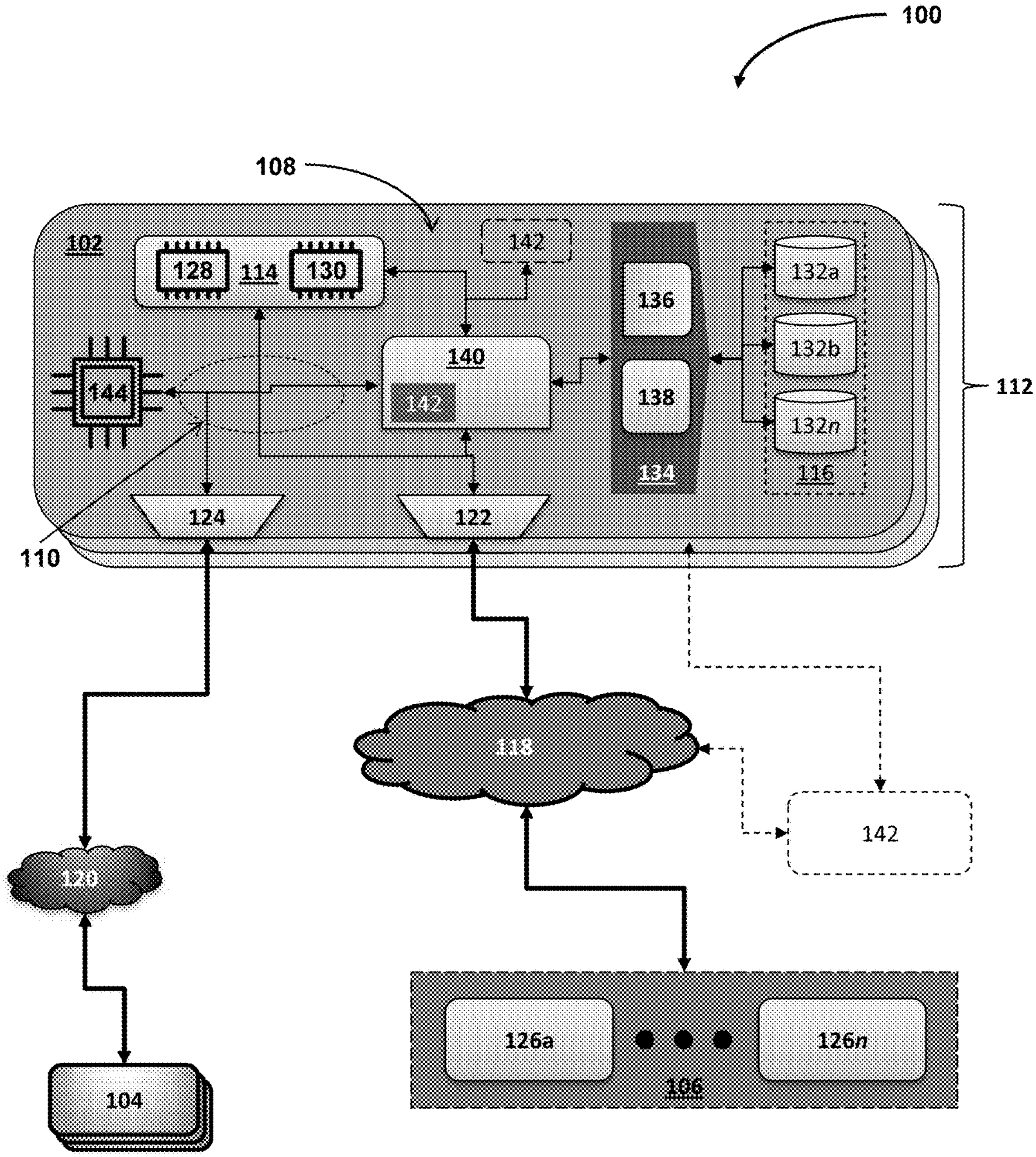
FIG. 1 illustrates a distributed network environment in accordance with embodiments of the present disclosure.

In today's digital age, data storage is crucial in our everyday lives, from personal computing to large-scale enterprise operations. Various storage devices, including solid-state drives (SSDs) and traditional hard disk drives (HDDs), are used to meet the growing demand for data storage and fast access.

However, all storage devices face challenges that can impact their longevity and performance. One of the primary issues affecting storage devices is elevated temperature. A storage device operating at high temperatures for extended periods can significantly diminish its lifespan. This is because the components within the storage devices are sensitive to heat and can degrade faster when exposed to high temperatures over time.

Another critical problem is thermal throttling. When a storage device's temperature reaches a certain threshold, it triggers a protective mechanism called thermal throttling. During this process, the storage device deliberately slows its operations to reduce heat generation. While this protects the device from potential damage, it results in a notable decline in performance, which can be frustrating for users and potentially disruptive for critical operations.

Current naïve approaches to managing these issues often rely on reactive measures. For instance, some storage device vendors implement aggressive thermal throttling, dramatically slowing down performance when overheating is detected. However, this approach is not ideal as it significantly impacts the user experience and system performance.

To address these challenges, embodiments of the present disclosure leverage the power of machine learning to enhance the longevity and performance of storage devices. This innovative approach utilizes Self-Monitoring, Analysis, and Reporting Technology (SMART) data collected via built-in sensors from storage devices. SMART data provides valuable insights into various aspects of a storage device's health and performance, including temperature, read/write operations, and error rates.

The embodiments can also employ advanced techniques, including Principal Component Analysis (PCA) and K-means clustering, to analyze this SMART data and identify patterns that may indicate impending thermal issues. By processing this data, the embodiments can forecast when and where thermal throttling will likely occur, allowing for proactive measures to be taken.

The embodiments can adjust read and write rates preemptively to prevent thermal throttling. For example, suppose a machine learning model predicts that a storage device is approaching a temperature that could trigger thermal throttling. In that case, it can dynamically reduce the rate of read and write operations to that specific device. This helps prevent the storage device from reaching the critical thermal threshold, thus avoiding the need for aggressive thermal throttling and maintaining better overall performance.

In other scenarios, the embodiments can intelligently transfer highly active data from hot to cooler devices. This load-balancing approach helps distribute the workload more evenly across multiple storage devices, preventing any single device from becoming a hot spot and reducing the overall thermal load on the system.

The embodiments can also incorporate a multi-level control system. At the first level, a machine learning model can identify the most critical variables influencing storage device temperature. At the second level, if temperatures remain elevated despite initial interventions, the embodiments can employ more aggressive data migration techniques to mitigate heat accumulation.

By implementing this predictive and adaptive approach, the embodiments can reduce customer service interruptions caused by thermal throttling, enhance energy efficiency, and prolong storage device lifespan. Additionally, the embodiments can help customers achieve better sustainability benchmarks by optimizing the performance and longevity of their storage infrastructure.

Thus, solutions employed by the embodiments disclosed herein represent a significant advancement in storage device management technology. By harnessing the power of machine learning to analyze SMART data and implement proactive thermal management strategies, the embodiments address the critical issues of storage device longevity and performance in a more sophisticated and effective manner than traditional reactive approaches.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and others. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126*a-n*, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132*a-n*. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132*a-n*).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126*a-n*) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
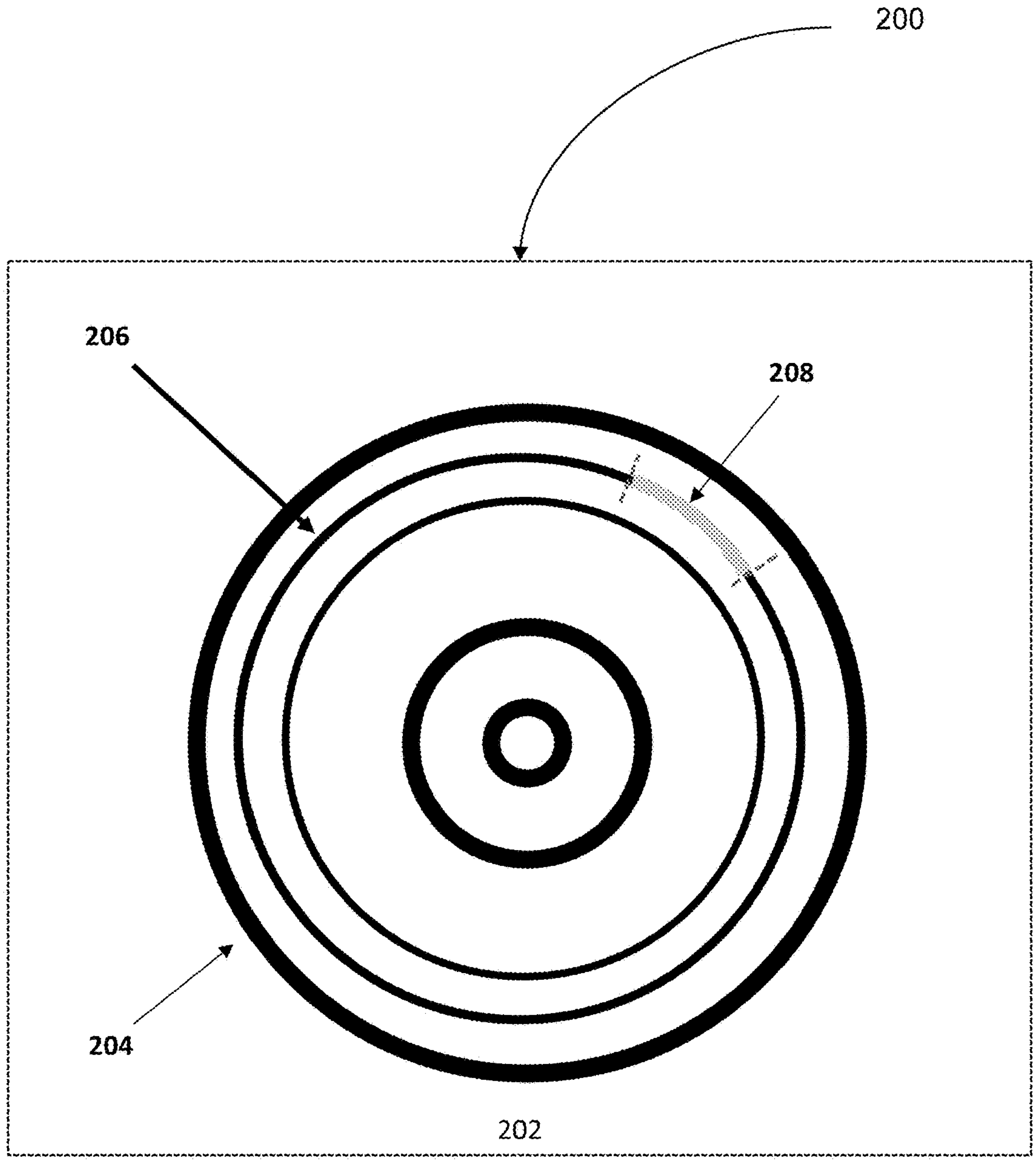
FIG. 2 is a cross-sectional view of a storage device in accordance with embodiments of the present disclosure.

Regarding FIG. 2, the storage array's EDS 140 can virtualize the array's persistent storage 116. Specifically, the EDS 140 can virtualize a storage device 200, which is substantially like one or more of the storage devices 132*a-n*. For example, the EDS 140 can provide a host, e.g., client machine 126*a*, with a virtual storage device (e.g., thin-device (TDEV)) that logically represents zero or more portions of each storage device 132*a-n*. For example, the EDS 140 can establish a logical track using zero or more physical address spaces from each storage device 132*a-n*. Specifically, the EDS 140 can establish a continuous set of logical block addresses (LBA) using physical address spaces from the storage devices 132*a-n*. Thus, each (LBA) represents a corresponding physical address space from one of the storage devices 132*a-n*. For example, a track can include 256 LBAs, amounting to 128 kb of physical storage space. Further, the EDS 140 can establish the TDEV using several tracks based on the desired storage capacity of the TDEV. The EDS 140 can also establish extents that logically define a group of tracks.

In embodiments, the EDS 140 can provide each TDEV with a unique identifier (ID) like a target ID (TID). Additionally, EDS 140 can establish a logical unit number (LUN) that maps each track of a TDEV to its corresponding physical track location using pointers. Further, the EDS 140 can also generate a searchable data structure, mapping logical storage representations to their corresponding physical address spaces. Thus, EDS 100 can enable the HA 122 to present the hosts 106 with the logical storage representations based on host or application performance requirements.

For example, the persistent storage 116 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 140 can provide each slice/portion with a corresponding logical block address (LBA). The EDS 140 can also group sets of continuous LBAs to establish one or more tracks. Further, the EDS 140 can group a set of tracks to establish each extent of a virtual storage device (e.g., TDEV). Thus, each TDEV can include tracks and LBAs corresponding to one or more of the persistent storage 116 or portions thereof (e.g., tracks and address spaces).

As stated herein, the persistent storage 116 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 140 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts'performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 140 can establish the hierarchy to include one or more tiers (e.g., subsets of the array's storage and memory) with similar performance capabilities (e.g., response times and uptimes). Thus, the EDS 140 can establish fast memory and storage tiers to service host-identified critical and valuable data (e.g., Platinum, Diamond, and Gold SLs). In contrast, slow memory and storage tiers can service host-identified, non-critical, less valuable data (e.g., Silver and Bronze SLs). The EDS 140 can also define "fast" and "slow" performance metrics based on relative performance measurements of the array's memory 114 and persistent storage 116. Thus, the fast tiers can include memory 114 and persistent storage 116, with relative performance capabilities exceeding a first threshold. In contrast, slower tiers can include memory 114 and persistent storage 116, with relative performance capabilities falling below a second threshold. Further, the first and second thresholds can correspond to the same threshold.

Figure 3:
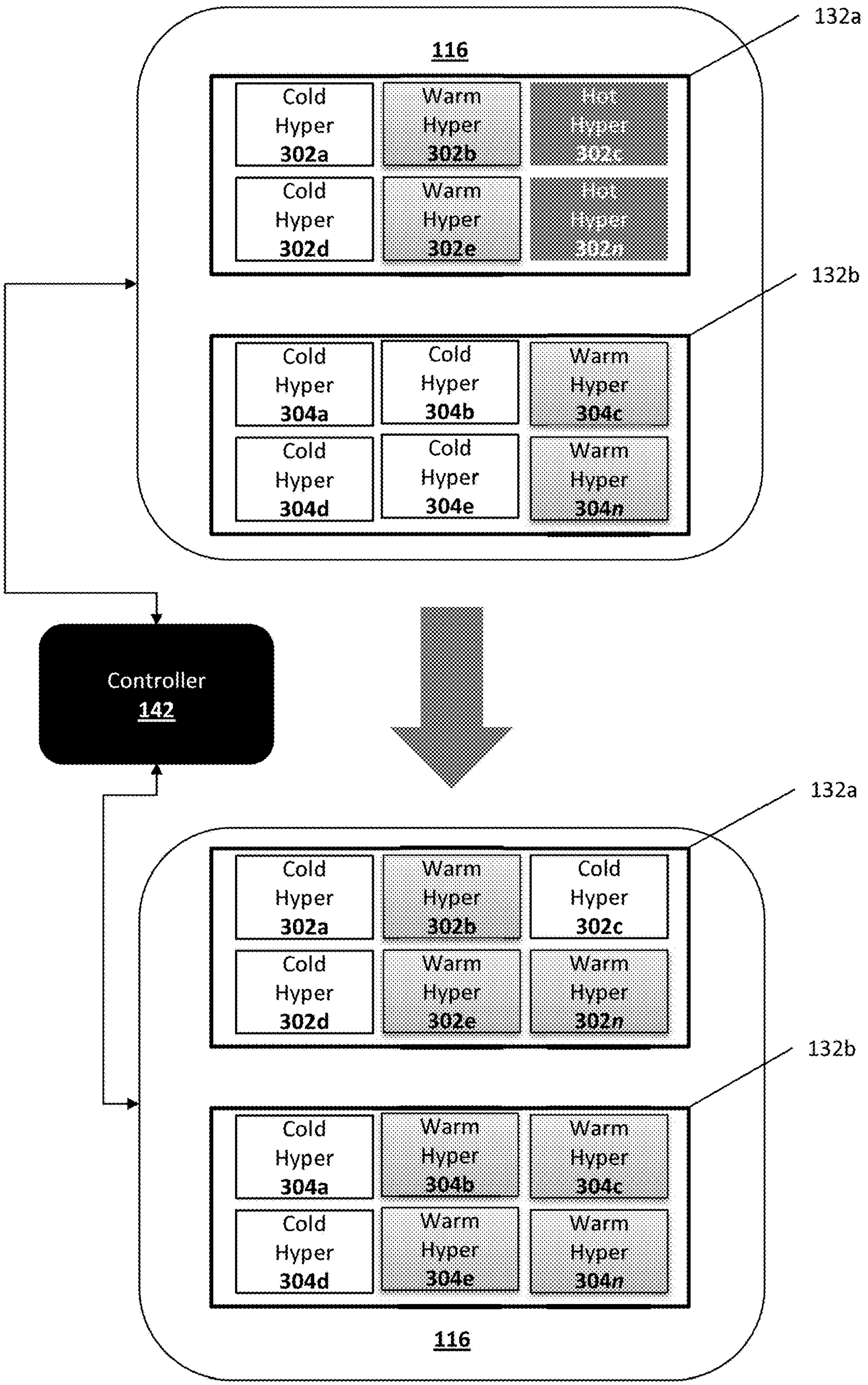
FIG. 3 is a block diagram of the thermal management of storage drives in accordance with embodiments of the present disclosure.

Regarding FIG. 3, persistent storage 116, like storage drives 132*a-b*, is susceptible to performance degradation and reduced lifespan due to elevated temperatures. Current naïve approaches to thermal management of persistent storage 116 typically involve reactive measures, such as thermal throttling, which significantly reduces drive performance when a critical thermal threshold is reached.

In embodiments, a controller 142 of a storage array (e.g., the storage array 102 of FIG. 1) can proactively enhance persistent storage longevity and performance through intelligent thermal management using machine learning techniques. For example, the controller 142 can collect Self-Monitoring, Analysis, and Reporting Technology (SMART) data from one or more storage devices via sensors and uses this data to control the mapping of logical tracks to physical tracks, thereby directing data to physical tracks in a manner that optimizes thermal distribution. The SMART data can include parameters such as power-on hours, media errors, maximum temperature seen, total bytes written and read, and erase counts.

In embodiments, the controller 142 can logically group portions of persistent storage devices 116 (e.g., storage devices 132*a-b*) into hypers 302*a-n*/304*a*. Accordingly, each hyper can include a collection of tracks (or data chunks) on a storage device. Further, the controller 142 can periodically collect data (e.g., every 30 minutes) corresponding to each hyper, including the total number of bytes read from or written to each hyper.

In addition, the controller 142 can collect temperature data through built-in sensors of the persistent storage devices 116. For example, the controller 142 can collect the temperature data periodically (e.g., every 30 minutes). The temperature data can include the current and maximum temperatures seen by each storage device 132*a-b*.

In embodiments, the controller 142 can use the SMART data and temperature data to identify storage devices 132*a-b* or portions thereof (e.g., hypers 302*a-n*/304*a-n*) at risk of reaching thermal thresholds. Using this information, the controller 142 can migrate data or adjust read/write rates to prevent thermal throttling and maintain optimal performance.

For example, the controller 142 can use SMART data to identify activity levels of each hyper 302*a-n*/304*a-n*. Using the activity levels of each hyper and temperature data of the storage device corresponding to the hyper, the controller 142 can define a hyper as being 'cold,' 'warm,' or 'hot.' For example, the controller 142 can define a hyper below a first thermal threshold or first activity level threshold as 'cold.' In addition, the controller 142 can define a hyper above a second thermal threshold or above a second activity level threshold as 'warm.' Furthermore, the controller 142 can define a hyper above a third thermal threshold or above a third activity level threshold as 'hot.'

In embodiments, the controller 142 can use one or more machine learning techniques to predict which storage devices 132*a-b* or portions thereof (e.g., hypers 302*a-n*/304*a-n*) that are likely to reach thermal thresholds based on the collected SMART and temperature data. For storage devices 132*a-b* or portions thereof that are predicted to reach thermal thresholds, the controller 142 can identify 'hot' hypers (data chunks) that are contributing to temperature increases. The controller 142 can then identify 'cooler' storage devices or corresponding hypers with temperature predictions under the first or second thermal thresholds. Thus, the controller 142 can redirect data from 'hot' hypers to 'warm' or 'cold' hypers of the same or different storage devices to lower the overall temperature each storage device predicted to reach a thermal throttling threshold as described in greater detail herein.

Figure 4:
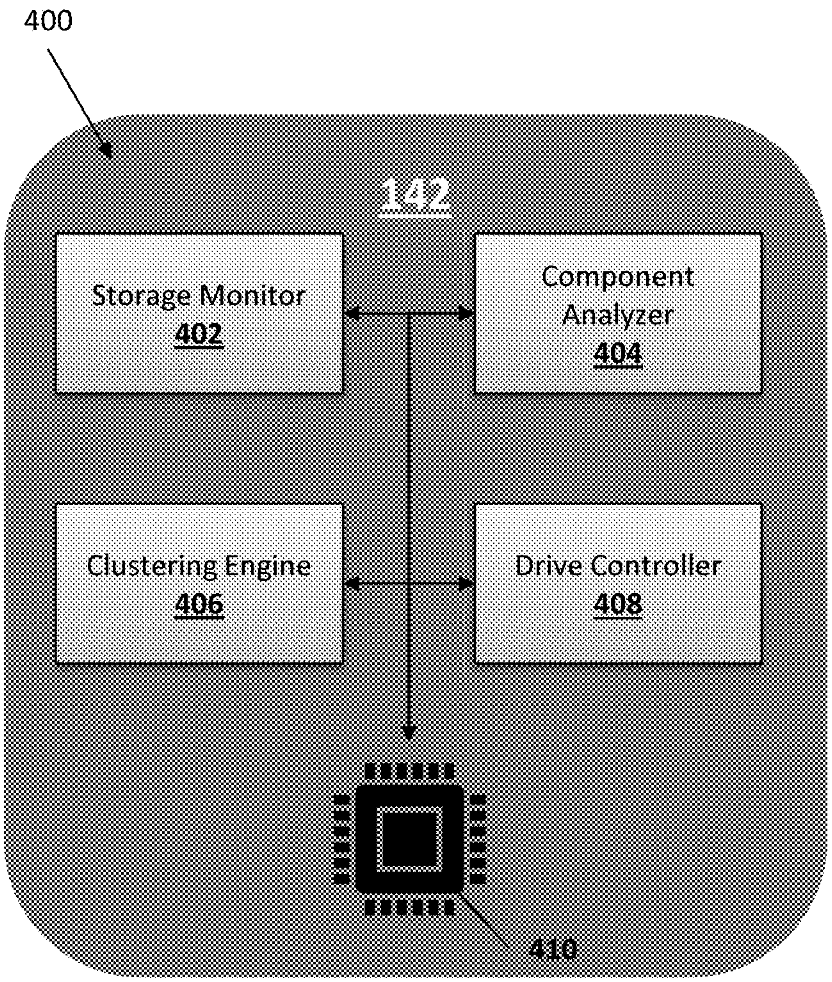
FIG. 4 is a block diagram of a controller in accordance with embodiments of the present disclosure.

Regarding FIG. 4, a controller 142 of a storage array (e.g., the storage array 102 of FIG. 1) includes hardware, logic, and circuitry 400 configured to enhance the longevity and performance of persistent storage devices (e.g., the persistent storage devices 132*a-n* of FIG. 1) through proactive thermal management and workload distribution.

In embodiments, the controller 142 can include a storage monitor 402 that collects Self-Monitoring, Analysis, and Reporting Technology (SMART) data from the storage devices via their built-in sensors. The SMART data can include power-on hours (POH), media errors, maximum temperature seen, total bytes read and written, error counts (e.g., unsafe and non-graceful shutdowns), power cycle count, write amplification, background scan count, and the like.

The storage monitor 402 can periodically collect SMART and temperature data (e.g., every 30 minutes). The storage monitor 402 can establish the length of each period to ensure it maintains up-to-date information on the health and performance of each storage device. The storage monitor 402 can use sensors built into each storage device to gather the data. The storage monitor 402 can also store the data in a local memory 410. For example, the storage monitor 402 can organize the data into a structured and searchable format, allowing for easier processing and analysis by each component 400 of the controller 142.

The storage monitor 402 can track the temperature of each storage device, recording the maximum temperature seen by each storage device. The storage monitor 402 can also track the total bytes read from and written to each storage device or portions thereof. This information is vital for understanding the workload distribution and identifying heavily used drives. The storage monitor 402 can also log various errors and events, like media errors, unsafe shutdowns, and non-graceful shutdowns, which are crucial for assessing each storage device's overall health and reliability.

Further, the storage monitor 402 can maintain, in the local memory 410, a historical record of the collected SMART and temperature data. The historical data can identify trends, patterns, and changes in storage drive behavior over time, which is crucial for predictive maintenance and performance optimization.

In embodiments, the controller 142 can include a component analyzer 404 that processes the SMART and temperature data collected by the storage monitor 402 using one or more advanced machine learning techniques.

The component analyzer 404 can reduce the dimensionality of the SMART data using a Principal Component Analysis (PCA) technique. For example, the SMART data can include n (e.g., 50+) columns, each corresponding to a feature/dimension of the storage devices. PCA allows the component analyzer 404 to transform the original high-dimensional feature space into a lower-dimensional space while retaining most of its variance.

Using PCA, the component analyzer 404 identifies patterns and correlations among various SMART attributes. This process helps understand the relationships between different parameters and their impact on storage device health and performance. Additionally, the component analyzer 404 can use PCA to identify the most critical features influencing storage device temperature and performance. It can assign weights to different SMART attributes based on their impact. For example, it might identify power-on hours (POH), media errors, maximum temperature seen, and total bytes read/written as highly influential factors. Using the processed and analyzed data, the component analyzer 404 contributes to developing predictive models. These models can forecast when thermal throttling might occur or when a drive's temperature will likely reach a critical threshold.

In embodiments, the controller 142 can include a clustering engine 406 that received the processed and dimensionally reduced SMART data from the component analyzer 404. Accordingly, the clustering engine 406 receives data that has already undergone Principal Component Analysis (PCA), identifying the most critical features influencing SSD temperature and performance.

The clustering engine 406 can employ K-means clustering on the reduced dimensionality SMART data. Using K-means clustering, the clustering engine 406 partitions the storage device data into distinct clusters, identifying groups of storage devices with similar characteristics.

To find the optimal number of clusters for K-means clustering, the clustering engine 406 can use a silhouette score technique. The silhouette score technique can compute a silhouette score for different values of k (number of clusters). Additionally, the technique can measure how similar an object corresponding to a storage device is in its cluster compared to others. Accordingly, the technique can select the value of k that maximizes the silhouette score, indicating well-defined clusters. Thus, the clustering engine 406 can use K-means clustering to identify a cluster of drives that can require thermal throttling or are at risk of overheating.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

In embodiments, the controller 142 can include a drive controller 408 that implements thermal management actions based on the analysis provided by the component analyzer 404 and the clustering engine 406.

When the clustering engine 406 identifies a cluster of hot drives or portions thereof, the drive controller 408 can proactively adjust read and write operations to overheated storage devices or portions thereof (e.g., hypers). The drive controller 408 can determine the adjustment rate by the predicted temperature increase rate learned from a machine learning technique.

Suppose the temperature of a storage device or corresponding hyper remains over a certain threshold (e.g., 60° C.). In that case, the drive controller 408 can initiate data migration across hypers (data chunks) to mitigate heat accumulation. The drive controller 408 can transfer highly active data from hot storage devices or hypers to cooler storage devices or hypers. For instance, the drive controller 408 can calculate host total bytes read or written per storage device as the sum of bytes read or written by all hypers of the storage device. Using the calculations, the drive controller 408 can transfer active hypers (data chunks) from a hot storage device or hyper to a cooler storage device or hyper.

The drive controller 408 can also manage the mapping of logical tracks to physical tracks of the storage devices based on the SMART data analysis. The drive controller 408 can direct data to the physical tracks based on this mapping. Thus, the drive controller 408 can use the mapping for efficient data placement and thermal management.

In embodiments, the drive controller 408 can analyze input/output (IO) operations corresponding to one or more IO workloads received by the storage array. The drive controller 408 can correlate data corresponding to the IO operations and each IO workload with corresponding SMART data. The drive controller 408 can make informed decisions regarding data placement and thermal management using the correlated information.

For example, the drive controller 408 can predict when a temperature corresponding to one or more portions of each storage device will reach a thermal threshold using the correlated data. Based on this prediction, the drive controller 408 can adjust the rate of read or write IO operations to the affected portions (hypers) of the storage devices. To manage temperature and performance, the drive controller 408 can remap logical tracks associated with physical tracks of overheating portions of a storage device to other physical tracks of the same SSD with temperature predictions under a thermal threshold. Alternatively, the drive controller 408 can remap the logical tracks to physical tracks corresponding to portions (hypers) of another storage device with temperature predictions under a thermal threshold.

Figure 5:
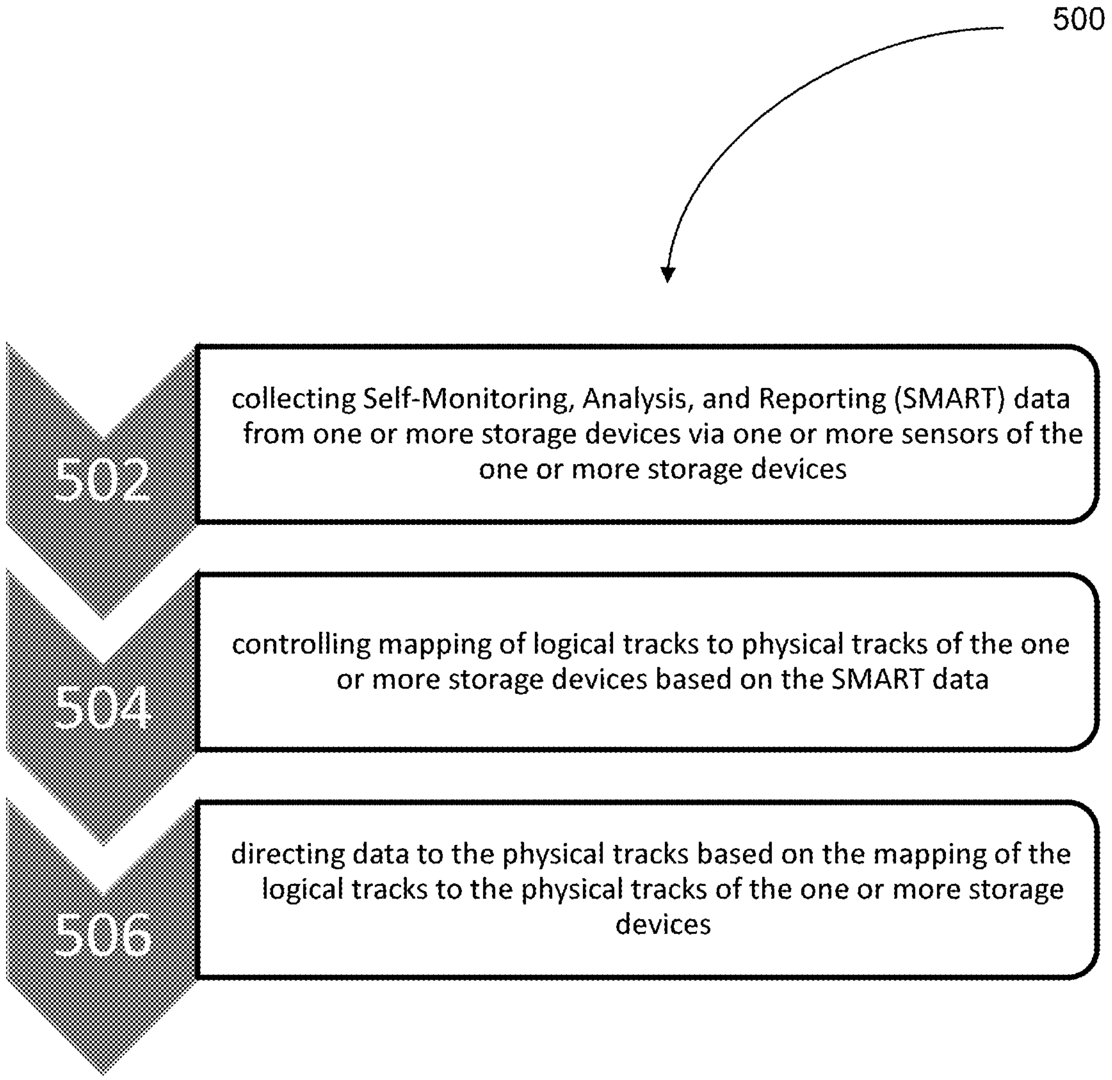
FIG. 5 is a flow diagram of a method for thermal management of storage devices per embodiments of the present disclosure.

Regarding FIG. 5, a method 500 relates to the thermal management of storage devices. In embodiments, the controller 142 of FIG. 1 can perform all or a subset of operations corresponding to the method 500.

For example, the method 500, at 502, can include collecting Self-Monitoring, Analysis, and Reporting (SMART) data from one or more storage devices via one or more sensors of the one or more storage devices. Additionally, at 504, the method 500 can include controlling mapping of logical tracks to physical tracks of the one or more storage devices based on the SMART data. Further, the method 500, at 506, can include directing data to the physical tracks based on the mapping of the logical tracks to the physical tracks of the one or more storage devices.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the steps of the method. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer with a graphical user interface, a web browser through which a user can interact with an example implementation or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise when computer programs run on the respective computers and have a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a World Wide Web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:

collecting Self-Monitoring, Analysis, and Reporting (SMART) data from one or more non-volatile storage devices via one or more sensors of the one or more non-volatile storage devices, wherein the SMART data comprises one or more of power-on hours, media errors, maximum temperature, total bytes read and written, and temperature predictions;

using a component analyzer to reduce a dimensionality of the collected SMART data using one or more principal component analysis (PCA) techniques to generate reduced-dimensionality SMART data used to identify critical features influencing storage device temperature;

using a clustering engine to perform k-means clustering on the reduced-dimensionality SMART data to identify groups of the one or more non-volatile storage devices with similar thermal characteristics;

predicting, based on the clustering, when a temperature corresponding to one or more portions of the one or more non-volatile storage devices will reach a thermal threshold;

controlling mapping of logical tracks to physical tracks of the one or more non-volatile storage devices based on the reduced-dimensionality SMART data and the prediction; and directing data to be written to the one or more non-volatile storage devices to the physical tracks of the one or more non-volatile storage devices based on the mapping of the logical tracks of the one or more non-volatile storage devices to the physical tracks of the one or more non-volatile storage devices and based on the prediction to proactively prevent thermal throttling; grouping the one or more non-volatile storage devices into hypers, wherein each hyper includes a collection of tracks on a non-volatile storage device of the one or more non-volatile storage devices, and wherein the grouping is based on similar thermal and activity characteristics including one or more of: power-on hours, media errors, maximum temperature, total bytes read and written, and temperature predictions after prevent thermal throttling.

2. The method of claim 1, further comprising:

receiving an input/output (IO) workload by a storage array housing the one or more non-volatile storage devices;

analyzing IO operations corresponding to the IO workload; and correlating the SMART data with IO data corresponding to the analysis of the IO operations.

3. The method of claim 1, further comprising:

predicting thermal throttling of the one or more non-volatile storage devices based on the SMART data.

4. The method of claim 1, further comprising:

predicting when a temperature corresponding to one or more portions of the one or more non-volatile storage devices will reach a thermal threshold based on the SMART data.

5. The method of claim 4, further comprising:

adjusting a rate of read or write input/output (IO) operations to the one or more portions of at least one subject non-volatile storage device of the one or more non-volatile storage devices based on the prediction of when the temperature corresponding to the one or more portions of the one or more non-volatile storage devices will reach the thermal threshold.

6. The method of claim 5, further comprising:

adjusting the rate of the read or write IO operations to the one or more portions of the at least one subject non-volatile storage device by remapping logical tracks associated with physical tracks of the one or more portions of the subject non-volatile storage device to other physical tracks of the subject non-volatile storage device with temperature predictions under the thermal threshold.

7. The method of claim 5, further comprising:

remapping logical tracks associated with physical tracks of the one or more portions of the subject non-volatile storage device to physical tracks corresponding to one or more portions of another non-volatile storage device of the one or more non-volatile storage devices, wherein the one or more portions of the other non-volatile storage device have temperature predictions under the thermal threshold.

8. An apparatus with a memory and processor, the apparatus configured to:

collect Self-Monitoring, Analysis, and Reporting (SMART) data from one or more non-volatile storage devices via one or more sensors of the one or more non-volatile storage devices, wherein the SMART data comprises one or more of power-on hours, media errors, maximum temperature, total bytes read and written, and temperature predictions;

use a component analyzer to reduce a dimensionality of the collected SMART data using one or more principal component analysis (PCA) techniques to generate reduced-dimensionality SMART data used to identify critical features influencing storage device temperature;

use a clustering engine to perform k-means clustering on the reduced-dimensionality SMART data to identify groups of the one or more non-volatile storage devices with similar thermal characteristics;

predict, based on the clustering, when a temperature corresponding to one or more portions of the one or more non-volatile storage devices will reach a thermal threshold;

control mapping of logical tracks to physical tracks of the one or more non-volatile storage devices based on the reduced-dimensionality SMART data and the prediction; and direct data to be written to the one or more non-volatile storage devices to the physical tracks of the one or more non-volatile storage devices based on the mapping of the logical tracks of the one or more non-volatile storage devices to the physical tracks of the one or more non-volatile storage devices and based on the prediction to proactively prevent thermal throttling; grouping the one or more non-volatile storage devices into hypers, wherein each hyper includes a collection of tracks on a non-volatile storage device of the one or more non-volatile storage devices, and wherein the grouping is based on similar thermal and activity characteristics including one or more of: power-on hours, media errors, maximum temperature, total bytes read and written, and temperature predictions after prevent thermal throttling.

9. The apparatus of claim 8, further configured to:

receive an input/output (IO) workload by a storage array housing the one or more non-volatile storage devices;

analyze IO operations corresponding to the IO workload; and correlate the SMART data with IO data corresponding to the analysis of the IO operations.

10. The apparatus of claim 8, further configured to:

predict thermal throttling of the one or more non-volatile storage devices based on the SMART data.

11. The apparatus of claim 8, further configured to:

predict when a temperature corresponding to one or more portions of the one or more non-volatile storage devices will reach a thermal threshold based on the SMART data.

12. The apparatus of claim 11, further configured to:

adjust a rate of read or write input/output (IO) operations to the one or more portions of at least one subject non-volatile storage device of the one or more non-volatile storage devices based on the prediction of when the temperature corresponding to the one or more portions of the one or more non-volatile storage devices will reach the thermal threshold.

13. The apparatus of claim 12, further configured to:

adjust the rate of the read or write IO operations to the one or more portions of the at least one subject non-volatile storage device by remapping logical tracks associated with physical tracks of the one or more portions of the subject non-volatile storage device to other physical tracks of the subject non-volatile storage device with temperature predictions under the thermal threshold.

14. The apparatus of claim 12, further configured to:

remap logical tracks associated with physical tracks of the one or more portions of the subject non-volatile storage device to physical tracks corresponding to one or more portions of another non-volatile storage device of the one or more non-volatile storage devices, wherein the one or more portions of the other non-volatile storage device have temperature predictions under the thermal threshold.

* * * * *